April 22, 1924.

W. R. MOORE 1,491,054

AUTOMATIC LIQUID DISPENSING APPARATUS

Filed Oct. 28, 1919

W. R. MOORE 1,491,054

AUTOMATIC LIQUID DISPENSING APPARATUS

Filed Oct. 28, 1919     5 Sheets-Sheet 2

WITNESSES

INVENTOR
William R. Moore.
BY
ATTORNEYS

April 22, 1924.

W. R. MOORE

AUTOMATIC LIQUID DISPENSING APPARATUS

Filed Oct. 28, 1919

WITNESSES

INVENTOR
William R. Moore.
BY
ATTORNEYS

April 22, 1924.

W. R. MOORE 1,491,054

AUTOMATIC LIQUID DISPENSING APPARATUS

Filed Oct. 28, 1919    5 Sheets-Sheet 4

WITNESSES

INVENTOR
William R. Moore.
BY
ATTORNEYS

April 22, 1924.

W. R. MOORE

AUTOMATIC LIQUID DISPENSING APPARATUS

Filed Oct. 28, 1919

WITNESSES

INVENTOR
William R. Moore.
BY
ATTORNEYS

Patented Apr. 22, 1924.

1,491,054

UNITED STATES PATENT OFFICE.

WILLIAM R. MOORE, OF FAYETTEVILLE, ARKANSAS.

AUTOMATIC LIQUID-DISPENSING APPARATUS.

Application filed October 28, 1919. Serial No. 333,936.

*To all whom it may concern:*

Be it known that I, WILLIAM R. MOORE, a citizen of the United States, and a resident of Fayetteville, in the county of Washington and State of Arkansas, have invented certain new and useful Improvements in Automatic Liquid-Dispensing Apparatus, of which the following is a specification.

My invention relates to improvements in liquid dispensing apparatus, it being more particularly an improvement in that class of apparatus for dispensing gasoline, and it consists in the constructions, combinations and arrangements herein described and claimed.

The foremost object of my invention is to provide a liquid dispensing apparatus, in the use of which the purchaser inserts a proper coin for a corresponding amount of liquid, and pulls a handle, whereupon the operations of measuring, cutting off and dispensing the liquid are automatically performed.

A further object of the invention resides in the provision for making certain adjustments inside of the machine, for varying the quantity of liquid dispensed in accordance with fluctuating prices.

A further object of the invention is to provide adjustable means in a liquid dispensing apparatus, for delivering a greater or lesser quantity in accordance with fluctuation in the price, but enabling the use of single coins of standard denominations.

A further object of the invention is to provide in a liquid dispensing apparatus, a drive shaft operative to move a control and pump rack at different relative speeds, the pump rack being capable to perform a number of reciprocations while the control rack keeps moving in the same direction, means being provided to lock the drive shaft at certain times in the movements of the pump rack.

Other objects and advantages will appear in the following specification, reference being had to the accompanying drawings, in which:—

Figure 2:
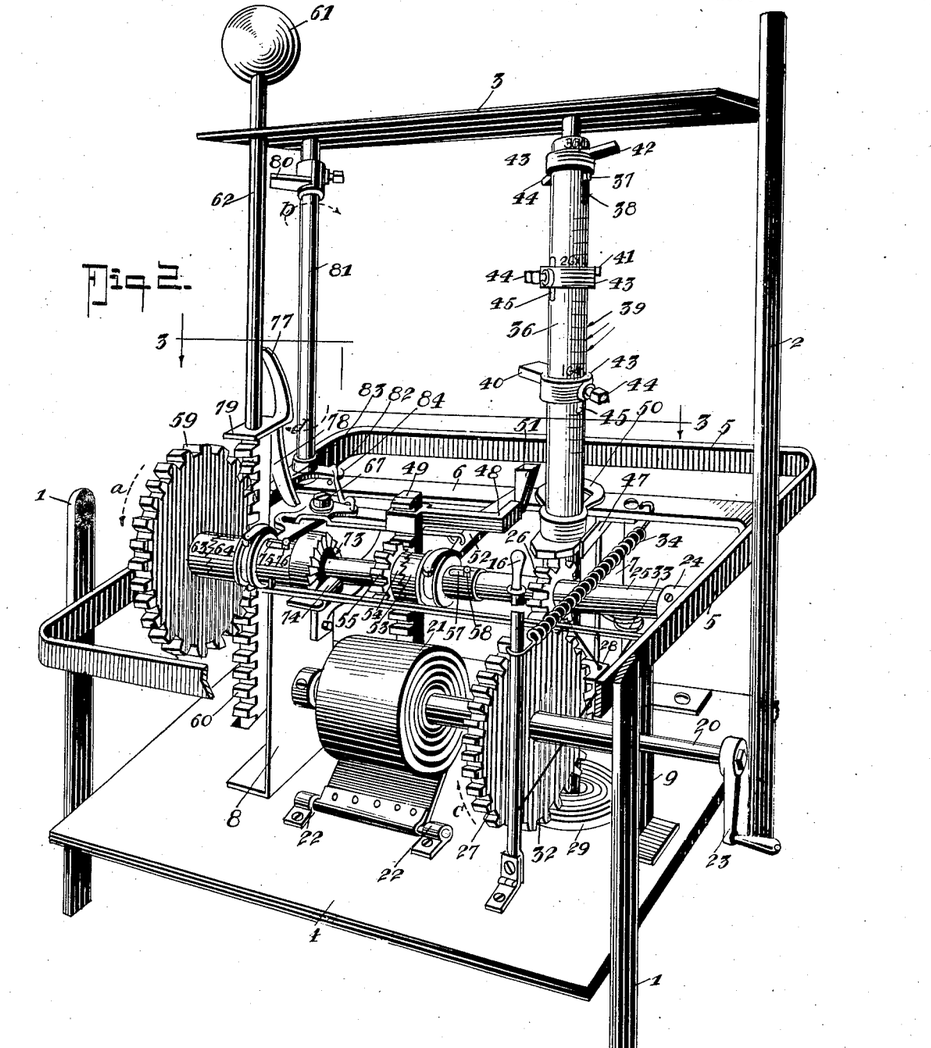
Figure 2 is a detail perspective view showing the mechanism of the automatic dispensing apparatus, the outer casing being removed.

*The frame of the machine* as clearly shown in Figure 2, comprises a plurality of frame standards 1, 2, the latter being longer than the former, for the purpose of supporting a plate 3 near the top. A base plate 4 is suitably mounted in place in the bottom of the frame, and arranged about intermediately of the height of the whole, is a rectangular loop 5, which offers a bearing for various parts.

Figure 1:
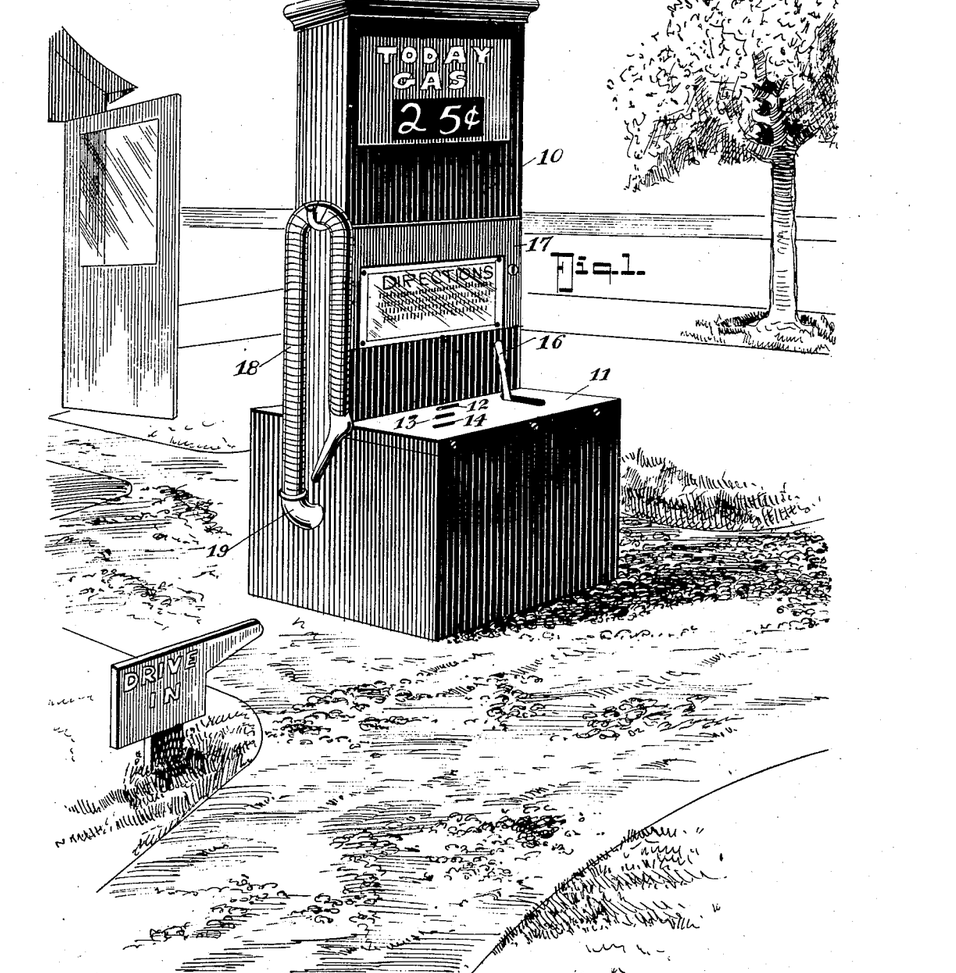
Figure 1 is a perspective view illustrating the general appearance of the apparatus from the outside.

A bar 6 extends across from side to side near the back of the machine, and extending through the base 4 from this bar is a bracket 7. Bearing standards 8, 9 extend up from the base 4. A housing 10, of suitable configuration, covers the whole frame and the mechanism contained therein, as shown in Figure 1.

This housing includes the front coin plate 11, with a plurality of slots 12, 13 and 14 for receiving quarters, half-dollars and whole dollars. The quantity of gasoline capable of being dispensed by the arrangement of the operating parts, described below, is not strictly compatible with the values of the coins to be inserted in the slots of the coin plate. This will become more apparent to the reader later on, but it may be here observed that the mechanism is set, simply for the purpose of illustration, to dispense a maximum of three gallons, this of course being a lesser quantity than the purchaser would expect to receive for the coin of maximum value, namely $1.00 at the current price of gasoline.

The coin plate 11 also has a lever slot 15 through which the lever or handle 16 protrudes, the lever normally reclining at the inner extremity of the slot. A door 17 enables access to the interior of the housing for the purpose of making adjustments when the price of gasoline fluctuates.

Hanging at the side of the housing 10 is the discharge hose 18, which at 19 connects in any suitable manner to the pump mechanism which is not illustrated in the drawings. The hose 18 is taken down off this hook and the nozzle is applied to the filling orifice of the tank of an automobile, as the purchaser inserts the proper coin in one of the slots and pulls the lever 16 forwardly the whole distance enabled by the insertion of the coin.

*The automatic dispensing mechanism* comprises a power shaft 20, journaled in the bearing standards 8, 9 and being driven only at such times when a dispensing operation takes place, by means of the power spring 21, or the equivalent thereof. One end is of course fastened to the shaft, while the other is anchored at 22 to suitable means mounted on the base plate 4. The spring is wound up by a handle 23 applicable to the non-circular end of the shaft on the outside of the housing 10.

Mounted in suitable bearings 24 in parallelism with and above the power shaft 20, is the drive shaft 25, which has a pinion 26 meshing with the drive gear 27 on the power shaft. Normally, neither shaft rotates, because a stop lug 28 engages the teeth of the gear 27 at a suitable place, to prevent rotation by the exertion of the power spring 21. This lug is normally retained in the gear engaging position by the influence of a spring 29 which is fastened at one end to the spring sleeve 30 on which the stop lug 28 is mounted at 31, as for example in Figure 11.

Figure 3:
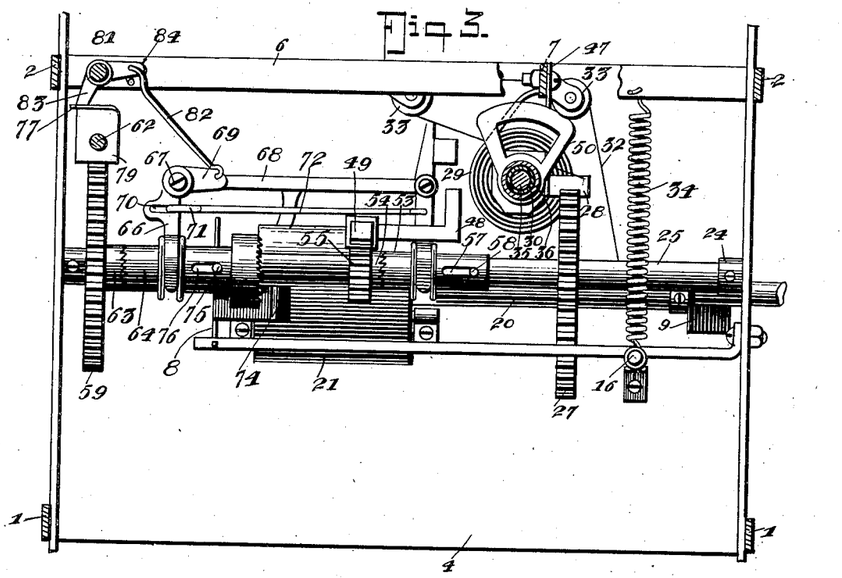
Figure 3 is a horizontal section taken substantially on the line 3—3 of Figure 2, the parts being in the normal position.
Figures 4, 5:
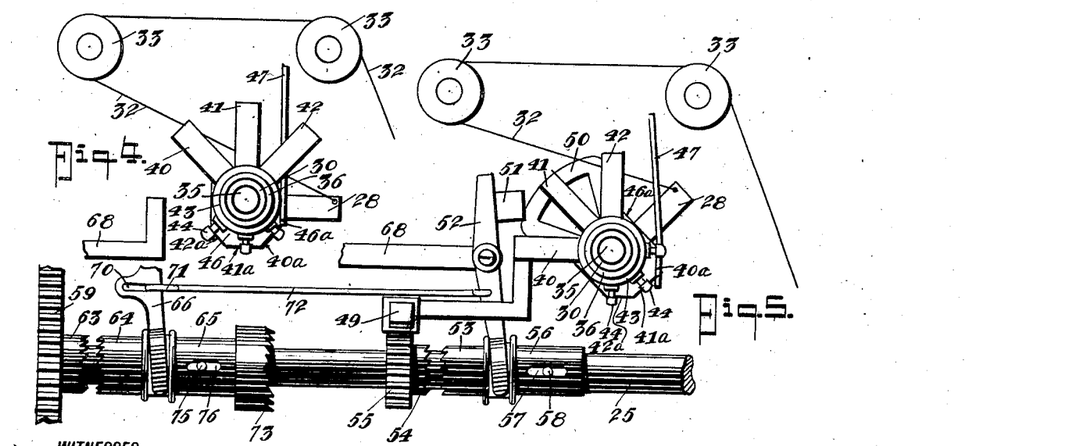
Figure 4 is a detail diagrammatic view, showing the radial stop fingers and other parts associated with the tapering standard.
Figure 5 is a plan view, similar in part to Figure 4, illustrating the action of the measuring standard parts at the end of a measuring operation.
Figures 6, 7, 8, 10:
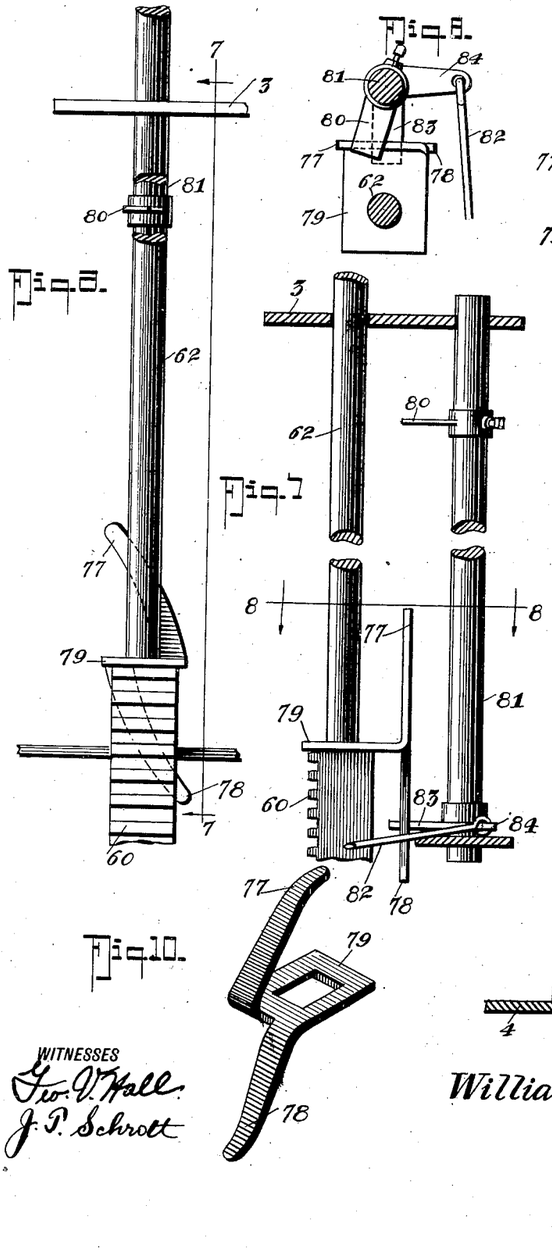
Figure 6 is a detail front elevation of a portion of the pump rack showing the stop and start cams, and the upper arm of the shift standard in back.
Figure 7 is a detail side elevation of the parts in Figure 6, viewed substantially on the plane 7—7.
Figure 8 is a detail horizontal section taken substantially on the line 8—8 of Figure 7.
Figure 10 is a detail perspective view of the plate bearing the stop and start cams.
Figure 9:
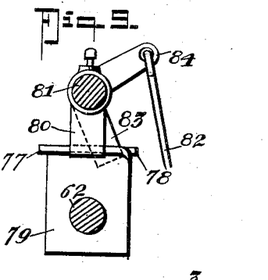
Figure 9 is a similar view showing how the upper arm of the shift standard is shifted when engaged by the upper stop arm in Figure 6.

A cable 32, attached to the lever 16, runs over suitable pulleys 33, one of which is mounted on the bracket 7 as in Figure 3, and is attached at the other end to the stop lug 28, so that when the lever 16 is pulled forwardly, against the tension of the spring 34, the stop lug 28 is moved away from the gear 27, as in Figure 5, releasing the power shaft 20 and causing the commencement of a dispensing operation. The other end of the spring 29 is attached at any suitable place to the base plate 4.

Extending from the support plate 3 to the base plate 4 is the measuring standard 35 on which the spring sleeve 30 is rockably mounted. A measuring sleeve 36 is fitted over the spring sleeve 30, occupying approximately the upper half of the sleeve. A pin 37 on the spring sleeve, extends through a slot 38 in the measuring sleeve, this provision enabling a slight vertical movement of the measuring sleeve on the spring sleeve, but causing both sleeves to turn together when the lever 16 is pulled forwardly as just explained. The measuring sleeve 36 is graduated in fractions of gallons at 39. Stop fingers 40, 41 and 42 extend in various radial positions from the measuring sleeve 36, being adjustably fixed in place with respect to the graduations 39, by means of collars 43, which encircle the sleeve 36, and set screws 44, the inner ends of which enter narrow grooves 45, in the sleeve. As indicated, the stop fingers are adjustable to register with certain of the graduations 39 above or below the gallon mark, so that when the price of gasoline fluctuates, the proper quantity can be dispensed.

For example, should the normal price of gasoline be 25¢ per gallon, the first stop finger 40 will be fixed in the proper location with respect to the graduations at the one gallon mark. The coin slot 12 is adapted to receive a twenty-five cent piece. Now should the price of gasoline go up, the vender of the gasoline will have to set the first stop finger 40 down a little lower so that the dispensing operation is terminated a little short of the time it would terminate under normal conditions, and thereby dispense a little less gasoline for the twenty-five cent piece inserted by the purchaser. Conversely, should the price of gasoline accidently go down, the vender will set the stop fingers proper distances above the normal gallon mark, so that the dispensing operation is correspondingly delayed and more gasoline is dispensed for the money.

The hollow grooves 45 are for the purpose of preventing changing of the radial positions of the stop fingers above adjustments. Mounted on the lower end of the measuring sleeve 36 is a holding plate 46 with a number of sides 40ª, 41ª, and 42ª respectively corresponding to the stop fingers 40, 41 and 42. These sides are at right angles to the various stop fingers, but it is possible that they may be in other relative positions.

Figure 11:
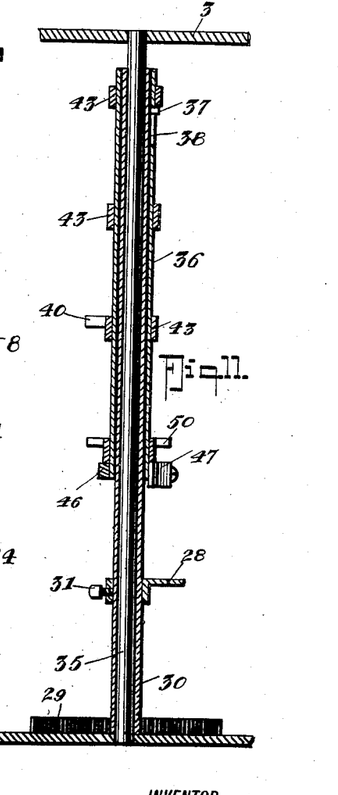
Figure 11 is a detail vertical section illustrating the associated parts of the measuring standard.

Normally, a leaf spring 47 presses against the side 46ᵃ of the holding plate, this side being flush with the adjacent peripheral portion of the sleeve 36 as clearly shown in Figure 11. On the first movement of the lever 16, that is to dispense one gallon, the sleeves 30 and 36 are partially rotated to bring the first side 40ᵃ into engagement with the spring 47, as in Figure 5, whereupon the positions of the stop fingers are shifted as shown so that the stop finger 40 stands over the trip arm 48 of the control rack 49, in position to be engaged by that arm.

When that happens, the measuring sleeve 36 is lifted so that the side 40ᵃ severs engagement with the holding spring 47, whereupon the spring 29 turns the sleeves 30, 36 back, and the stop lug 28 into re-engagement with the drive gear 27. This operation takes place at the dispensation of the requisite quantity of liquid represented by the coin inserted.

On the measuring sleeve 36 adjacent to the holding plate 46 is the wedge arc 50, which is normally in position aside from the wedge 51 on the control clutch arm 52, but is moved into operative relationship to the wedge when the sleeves 30, 36 are initially turned on pulling the lever 16. The wedge arc 50 is long enough to insure a portion thereof to assume an operative position in relation to the wedge 51, when the lever 16 is pulled forwardly to the limit.

Normally, that is to say, when the parts are dormant, and the mechanism is in readiness for operation, the arm 52 is in the position holding the control clutch 53 in engagement with the clutch element 54 of the control pinion 55, which meshes with the control rack 49 then in its lowermost position. The clutch 53 is part of the sleeve 56, which has a slot and pin connection 57, 58 with the drive shaft 25, so that the sleeve is capable of slidable movement by the arm 52 but is made to turn with the shaft.

The control pinion 55 is loose on the shaft 25, and so is the large pump gear 59 which meshes with the pump rack 60 at the far side of the machine. A weight 61 on the upper end of the weight staff 62 extending upwardly from the pump rack 60, urges the pump rack 60 to the lowermost position or to the beginning of a new pumping stroke by the rotation of the gear 59 in the direction of the dotted arrow $a$ in Figure 2.

A clutch element 63 on the pump gear 59, is normally engaged by the element 64 of the clutch sleeve 65, which is shifted by the bell crank 66, pivoted at 67 to the support 68, and provided with a short arm 69. The slot 70 in the arm 66 receives the elongated head 71 of the link 72, which connects to the control clutch arm 52. The bell crank 66 is capable of movement toward the right without affecting the control clutch arm 52, by reason of the slot and head connections 70, 71, but when the clutch arm 52 is moved toward the right by the rising of the arc 50 into engagement with the wedge 51, then both clutch sleeves 56, 55 are moved to the disconnected positions in Figure 5.

When such position is assumed, the teeth 73 of the sleeve 65 engage the dog or lock 74 on the bearing standard 8, and prevent further turning of the drive shaft 25 until the pump rack 60 gravitates to the normal lowermost position in readiness to perform another pumping stroke. Pin and slot connections 75, 76 between the shaft and sleeve, cause the sleeve to turn with the shaft but permit the necessary slidable movement of the sleeve on the shaft.

The shifting of the bell crank 66 is automatically performed when the pump rack 60 reaches the upper and lower extremities of its strokes, by stop and start cams 77, 78 on the cam plate 79 which is carried by the rack, as clearly shown in Figure 2. The cam 77 is engageable with the upper arm 80 to shift the standard 81 in the direction of the dotted arrow $b$, thereby to pull on the link 82, rock the bell crank 66 and shift the clutch element 64 out of engagement with the element 63 of the gear 59. This happens at the end of a pumping stroke, and the gear 59 is automatically freed so that the pump rack 60 can gravitate to the normal starting position. In the meantime, the shaft 25 is held blocked by the engagement of the lock 74 with the teeth 73.

Reverse shifting of the bell crank 66 occurs when the start cam 78 rides over the lower arm 83, to the extension 84 of which, the link 82 is connected. When this happens, the bell crank 66 is rocked back and the clutch elements 64, 63 moved into re-engagement for the performance of another pumping stroke. For a brief review of the operation, refer to the description under that head.

Figure 12:
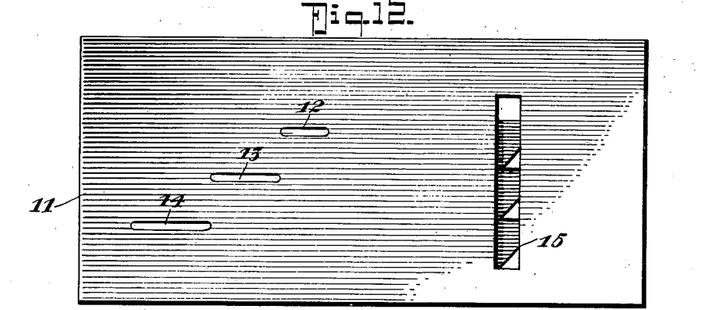
Figure 12 is a detail plan view of the coin slot plate.
Figure 13:
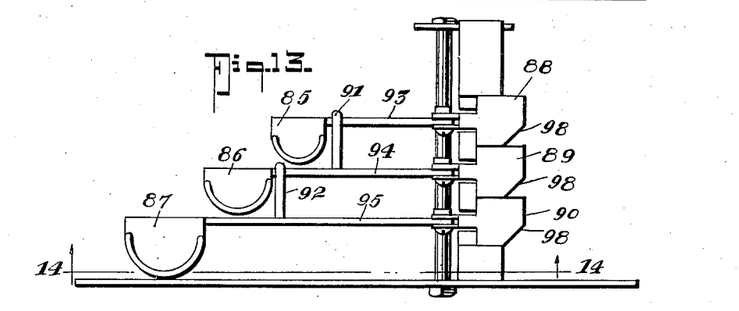
Figure 13 is a detail plan view of the coin operated mechanism beneath said plate.
Figure 14:
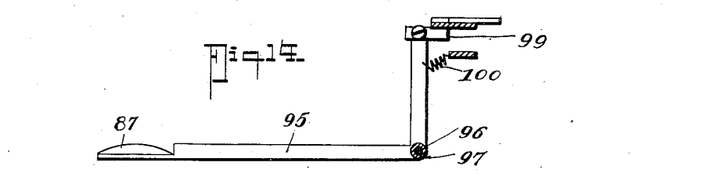
Figure 14 is a detail section taken substantially on the line 14—14 of Figure 13, and illustrating one of the coin-operated cranks and slides.
Figure 15:
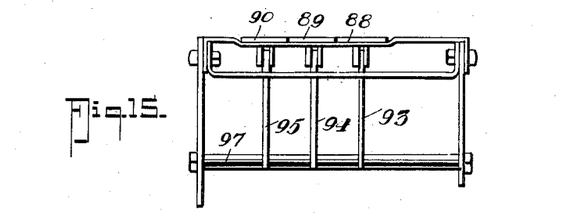
Figure 15 is a detail side elevation of the parts in Figure 13.

*The coin mechanism* is not quite as important as the automatic liquid dispensing apparatus, although of course some such arrangement as shown, must be provided in order to carry out the operation. A plurality of coin plates 85, 86 and 87 is located beneath the series of coin slots 12, 13 and 14 in Figures 12 and 13, so that when the proper coin is dropped in, the corresponding slide 88, 89 or 90 is moved from the path of the lever 16 in the lever slot 15, which lever must be moved forwardly to start the operation of the machine.

It is not meant that the slides 88, 89 and 90 are retracted individually, but they are cumulatively retracted so as to clear the path for the lever. This is done by means of pins 91, 92 which are respectively mounted on the bell cranks 94 and 95 so as to respectively extend across the bell cranks 93 and 94 as clearly shown in Figure 13. The bell cranks have a common pivotal mounting on the shaft 96, sleeves 97 separating the various bell cranks.

Should a quarter be dropped in the first slot 12, the coin plate 84 will lower by virtue of the weight of the coin, rocking the bell crank 93 and shifting the slide 88 from in front of the lever 16, which must be partially pulled forwardly before the coin falls off of the plate 85. This the coin will do almost immediately. Now should a coin be dropped in the second slot 13, the plate 86 will lower by virtue of the weight and cause not only the rocking of the bell crank 94, but also of the bell crank 93 by virtue of the extending pin 91.

It follows that both slides 88, 89 are retracted at once, and as before, the lever 16 must be promptly pulled forwardly and as quickly released, so as to start the operation of the machine. To enable the lever to get back to the original position, should any of the slides back in front of the lever before the purchaser has had time to shift the lever back, the various slides are beveled off at 98. Connections 99 join the bell cranks to the slides, and springs 100 draw the bell cranks and slides to the normal position.

The operation.

Normally, the lever 16 stands in the rearmost position in Figure 1, at the head of the series of slides 88, 89 and 90. The slides prevent the lever from being pulled forwardly. All of the mechanism on the inside of the housing is normally dormant, the parts then assuming the positions shown in Figures 2 and 3.

Assume now that the purchaser desires to buy two gallons of gasoline. He deposits a fifty-cent piece in the slot 13, whereupon the coin plate 86 is weighted down, rocking the bell cranks 94, 93 and retracting the slides 89, 88 so that the lever 16 is free to be pulled forwardly as far as the slide 90, which limits the forward movement.

Consider Figures 2, 3, 4 and 5. The pinion 55 and pump gear 59 are loose on the drive shaft 25, but the clutches 53, 54 are in engagement. On pulling the lever 16 forwardly against the tension of spring 34, the cable 32 is pulled, causing the disengagement of the stop lug 28 from the drive gear 27 on the power shaft 20. The same movement of the lever 16 causes the spring and measuring sleeves 30, 36 to partially turn together to that extent which discloses the second stop finger 41 over the end of the control arm 48, at the same time moving the side 41ª of the holding plate 46 into contact with the leaf spring 47 to prevent counter rotation of the sleeves by virtue of the spring 29 at the bottom.

Normally, the radial stop fingers 40, 41 and 42 are in the positions in Figure 4. But when the sleeves are partially rotated as described above, the positions of the fingers are changed. In Figure 5, the position of the first finger 40 indicates that the lever 16 has been moved the distance of only one slide. According, only one gallon can be dispensed. The reader should picture to himself that the sleeve has been moved a distance represented by two slides, consequently the second finger 41 is to be considered in place over the control arm 48, the first finger 40 being out of the upward path of movement of the control arm.

The mechanism is now in motion. The power shaft 20 moves in the direction of the arrow c in Figure 2, while the drive shaft 25 moves in the direction of the arrow a. The rack 49 reaches a position wherein the control arm 48 would engage the first stop finger 40, were it in place, at the same time that the pump rack 60 reaches the top of its pumping stroke, notwithstanding the fact that the stroke of the pump rack is considerably greater than one unit of a stroke of the control rack.

This difference in the speed of strokes of the control and pump racks 49 and 60 occurs because of the difference in diameter of the pinion 55 and pump gear 59. The pump rack 60 moves more rapidly than does the rack 49. As soon as the rack reaches the top of the first pumping stroke, the stop cam 77 slides against the upper arm 80, rotating the shift standard 81 in the direction of the arrow b, thereby pulling on the link 57, rocking the bell crank 66 and shifting the clutch element 64 away from the element 63 and stopping the rotation of the pump gear 59.

At this same instant the drive shaft 25 is stopped from rotation by the engagement of the teeth 73 of the sleeve 65, with the lock 74, thereby giving the pump rack 60 time to gravitate to the original lowermost position. In the meantime, the control rack 49 stands still in mid position, the control clutch arm 52 not having been affected by the shifting of the clutch bell crank 66.

The pump rack 60 now reaches the lowermost position. The start cam 78 slides over the lower arm 83, partially rotating the shift standard 81 in the direction of the dotted arrow b, pushing on the link 82, rocking the bell crank 66 in the reverse direction and again shifting the sleeve 65 so that the clutch elements 64, 63 re-engage. The lock 74 is disengaged by the teeth 73 and the drive shaft 25 continues rotation.

Necessarily it follows that the control rack 49 continues in upward movement, and simultaneously, or substantially so, with the reaching of the pump rack 60 the upper extremity of the second stroke the control arm 48 reaches and engages the second stop finger 41, so that the stop finger and measuring sleeve 36 are slightly lifted together, causing the wedge arc 50 to ride against the wedge 51, rock the clutch arm 52 and simultaneously shift both clutches 53, 54 out of engagement with the respective clutch elements.

Thus both the pinion 55 and gear 59 are freed and the drive shaft 25 is locked from further rotation by the engagement of the teeth 73 with the lock 74. On the slight upward movement of the sleeve 36, the side 41ᵃ was moved out of engagement with the spring 47, permitting the spring 29 at the bottom to counter rotate both sleeves 30, 36, the control arm 48 having at this time disengaged the second stop finger 41, since both racks 49, 60 are already gravitating to the normal positions, the sleeve 36 then dropping back so that the side 46ᵃ engages the spring 47 and the stop lug 28 re-engages the drive gear 27. The pump rack 60 will presently reach the limit of its downward movement, at which time the stop cam 78 actuates the bell crank 66 to move both clutch elements 53, 54 back into engagement with the respective gears, whereupon the mechanism is ready for another dispensing operation.

If the mechanism is arranged to dispense, say for example ten gallons, or better, a maximum of ten gallons, the reader can understand at once from the foregoing description, that the control rack 49 would gradually move upwardly a sufficient distance to engage a tenth stop finger, while the pump rack 60 would perform ten separate strokes. All of the mechanism stops completely while the pump rack moves from the end of a pumping stroke to the original position in readiness to begin a new stroke. It is thought unnecessary to illustrate the modification just referred to, because that is merely an expansion of the principle already fully made clear.

While the construction and arrangement of the improved automatic liquid vending apparatus, as herein described and claimed, is that of a generally preferred form, obviously modifications and changes may be made without departing from the spirit of the invention or the scope of the claims.

I claim:—

1. Liquid dispensing apparatus comprising a pump rack, a pump gear in mesh with the rack adapted to cause the rack to perform a stroke, a drive shaft carrying the gear, a sleeve on the shaft having a toothed surface at one end and a clutch at the other the latter being adapted to hold the gear in driving engagement with the shaft, means by which the sleeve is slidably keyed to the shaft, means adapted to slide the sleeve to disengage the clutch, means carried by the pump rack operating said means at the end of a stroke, and means adapted to be engaged by said toothed surface when the sleeve is slid to lock the shaft from rotation.

2. Liquid dispensing apparatus comprising a pump rack, a pump gear in mesh with the rack adapted to cause the rack to perform a stroke, a drive shaft carrying the gear, a sleeve on the shaft having a toothed surface at one end and a clutch at the other the latter being adapted to hold the gear in driving engagement with the shaft, means by which the sleeve is shiftably keyed to the shaft, means adapted to shift the sleeve to disengage the clutch, turnable means adapted to actuate said shifting means, means carried by the pump rack operating said turnable means at the end of a stroke, and means adapted to be engaged by said toothed surface when the sleeve is shifted to lock the shaft from rotation.

3. Liquid dispensing apparatus comprising a pump rack, a pump gear in mesh with the rack adapted to cause the rack to perform a pumping stroke, a clutch adapted to engage and drive said gear for the performance of said stroke, turnable means, a connection between the turnable means and the clutch, means to turn the turnable means in one direction when the pump rack reaches the end of the pumping stroke to disengage the clutch and free the gear, and means to turn the turnable means in another direction when the rack reaches the end of the return stroke to again engage the clutch and gear.

4. Liquid dispensing apparatus comprising a pump rack, a pump gear in mesh with the rack adapted to cause the rack to perform a pumping stroke, a standard, bearings in which the standard is mounted to turn, a clutch adapted to engage and drive said gear for the performance of said stroke, clutch shifting means in connection with said standard, stop and start cams carried by the rack, an arm on the standard adapted to be engaged by the stop cam at the end of a pumping stroke to turn the standard in one direction and disengage the clutch, and another arm on the standard adapted to be engaged by the start cam at the end of the rack return stroke to turn the standard in the other direction and re-engage the clutch.

5. Dispensing apparatus comprising a drive shaft, drive means for the shaft, a pump gear loose on the shaft, a clutch slidably keyed on the shaft adapted to engage the gear to turn with the shaft, a pump rack in mesh with the gear caused to perform a pumping stroke, a bell crank adapted to shift the clutch, means which operate when the pump rack reaches the end of a pumping stroke to rock the bell crank and disconnect the clutch from the gear, and means with which a part of the clutch then enters in locking engagement to hold both the shaft and the drive means stationary permitting the pump rack to make a return stroke as the pump gear revolves idly on said shaft.

6. Dispensing apparatus comprising a drive shaft, driving means therefor, a pump gear loose on the shaft and having a clutch element, a corresponding clutch sleeve slidable on the shaft but having means by which it is keyed thereon to rotate with the shaft, a toothed surface on the sleeve, a dog on which said surface is spaced when the clutch sleeve engages the clutch element of the gear, means upon which the dog has a fixed mounting, a pump rack caused to perform a pumping stroke by the pump gear, means which is adapted to be moved when the rack reaches the end of a pumping stroke, means carried by the rack which then produces said movement, and connecting means between said movable means and the sleeve causing the disengagement of the sleeve clutch from said clutch element and the engagement of said toothed surface with said dog, thereby freeing the gear from locking the sleeve, shaft and driving means.

7. Dispensing apparatus including a pump rack, a pump gear in mesh with the rack adapted to move the rack on a pumping stroke, a sleeve having a clutch adapted to engage a clutch element on the gear to drive the gear, a bell crank in connection with the sleeve, a turnable standard, an arm carried by said standard having an extension in connection with the bell crank, another arm on the standard spaced from the first, a cam plate carried by the rack, a stop cam extending in one direction from said plate adapted to engage one of the arms at the end of a pumping stroke to turn the standard in one direction and shift the sleeve clutch into disengagement from the gear clutch, and another stop cam extending in another direction from said plate adapted to engage the other arm at the end of a return stroke of the rack to turn the standard in the opposite direction and shift the sleeve clutch into re-engagement.

8. Dispensing apparatus comprising a pump rack, a pump gear in mesh with the rack and having a clutch element, a drive shaft upon which the gear is loose, a clutch sleeve slidably keyed on the shaft adapted to engage the clutch element and drive the gear, control means associated with the pump rack comprising a control rack, a control pinion loose on the drive shaft in mesh with the rack and having a clutch element, a control clutch slidably keyed on the drive shaft adapted to engage and drive the control pinion through said clutch element, a bell crank in connection with the sleeve, a link connected to the bell crank, and an arm to which the link is also connected in turn having connection with said control clutch, said arm being adapted to be shifted in one direction to disconnect both the control clutch and clutch sleeve leaving the respective racks, gear and pinion free.

9. Dispensing apparatus comprising a pump rack, a pump gear in mesh with the rack and having a clutch element, a drive shaft upon which the gear is loose, a clutch sleeve slidably keyed on the shaft adapted to engage the clutch element and drive the gear, control means associated with the pump rack comprising a control rack, a control pinion loose on the drive shaft in mesh with the rack and having a clutch element, a control clutch slidably keyed on the drive shaft adapted to engage and drive the control pinion through said clutch element, a bell crank in connection with the sleeve, a link connected to the bell crank, an arm to which the link is also connected in turn having connection with said control clutch, said arm being adapted to be shifted in one direction to disconnect both the control clutch and clutch sleeve leaving the respective racks, gear and pinion free, and means then adapted to be engaged by a part of the clutch sleeve causing a locking of the drive shaft upon which the gear and pinion are free to rotate.

10. Dispensing apparatus comprising a pump rack, a pump gear in mesh with the rack and having a clutch element, a drive shaft upon which the gear is loose, a clutch sleeve slidably keyed on the shaft, control means for the pump rack comprising a control rack, a control pinion loose on the shaft and in mesh with the rack said pinion having a clutch element, a control clutch slidably keyed on the shaft, an arm for the control clutch adapted to shift said clutch both into and out of engagement with the clutch element of the control pinion; a bell crank adapted to shift the sleeve both into and out of engagement with the gear clutch element, and means connecting the bell crank and arm arranged to permit the bell crank to move to a disconnecting position without affecting said arm or the operative connection of the control clutch with said pinion but also arranged to simultaneously disconnect both clutches when said arm is shifted.

11. Dispensing apparatus comprising a pump rack, a pump gear in mesh with the rack and having a clutch element, a drive shaft upon which the gear is loose, a clutch sleeve slidably keyed on the shaft, control means for the pump rack comprising a control rack, a control pinion loose on the shaft and in mesh with the rack said pinion having a clutch element, a control clutch slidably keyed on the shaft, an arm for the control clutch adapted to shift said clutch both into and out of engagement with the clutch element of the control pinion; a bell crank adapted to shift the sleeve both into and out of engagement with the gear clutch element, means connecting the bell crank and arm arranged to permit the bell crank to move to a disconnecting position without affecting said arm or the operative connection of the control clutch with said pinion but also arranged to simultaneously disconnect both clutches when said arm is shifted, and means actuated by the pump rack upon making a pumping stroke to move said bell crank as aforesaid and shift the sleeve clutch out of engagement without affecting said arm.

12. Dispensing apparatus comprising a power shaft having a drive gear, a drive shaft having a pinion in mesh with the gear, a stop lug in engagement with the drive gear preventing rotation, a lever having connection with the lug for the withdrawal thereof upon operation of the lever to permit the rotation of the gear and pinion, a pump gear loose on the drive shaft, a pump rack in engagement with said gear, control means for the pump rack comprising a control rack, a control pinion on the drive shaft in mesh with the control rack, a control clutch for said pinion; a clutch sleeve on the drive shaft, a corresponding clutch element on the pump gear, and means including a bell crank and arm adapted to hold the sleeve and control clutch in engagement with the respective pump gear and control pinion for the operation of both racks when said lug is withdrawn.

13. Dispensing apparatus comprising a drive shaft, a control pinion on the shaft, a pump gear on the shaft, a clutch sleeve by means of which the gear is adapted to be connected with the shaft, a control clutch by means of which the pinion is adapted to be connected with the shaft, a pump rack adapted to be moved on a pumping stroke by the gear, a control rack adapted to be projected by said pinion, means for disconnecting the clutch sleeve when the rack reaches the end of a pumping stroke, and means by which the shaft is locked while the pump rack makes a return stroke preparatory to another pumping stroke, said locked condition of the shaft maintaining the control rack in a position to continue projection when said pumping stroke is resumed.

WILLIAM R. MOORE.